US012560459B2

(12) United States Patent
Bacon et al.

(10) Patent No.: US 12,560,459 B2
(45) Date of Patent: Feb. 24, 2026

(54) LOCK POSITION SENSING

(71) Applicant: Goodrich Actuation Systems Limited, Solihull (GB)

(72) Inventors: Peter Bacon, Wolverhampton (GB); Maamar Benarous, Coventry (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 193 days.

(21) Appl. No.: 17/977,207

(22) Filed: Oct. 31, 2022

(65) Prior Publication Data

US 2023/0137151 A1     May 4, 2023

(30) Foreign Application Priority Data

Nov. 3, 2021     (EP) ..................................... 21275154

(51) Int. Cl.
G01D 5/20          (2006.01)
F02K 1/76          (2006.01)

(52) U.S. Cl.
CPC .............. G01D 5/20 (2013.01); F02K 1/766 (2013.01)

(58) Field of Classification Search
CPC .................................. G01D 5/20; F02K 1/766
See application file for complete search history.

(56) References Cited

U.S. PATENT DOCUMENTS 6,293,489 B1 * 9/2001 Davies .................... F02K 1/766
                                                           60/230
7,511,478 B2    3/2009 Ganev 9,188,081 B2   11/2015 Wingett et al.
9,274,176 B2    3/2016 Day
9,989,383 B2 *  6/2018 Li ............................. G01D 5/20
10,222,239 B2   3/2019 Lillestolen et al.
10,294,893 B2   5/2019 Smith et al.
10,520,334 B2  12/2019 Creech et al.
10,823,264 B2  11/2020 Hawksworth et al.
10,914,267 B2   2/2021 Allut
2015/0090810 A1 *  4/2015 Lallement ............... F02K 1/763
                                                                          239/265.19
2019/0120173 A1 *  4/2019 Ghandour ................. F02K 1/60
2020/0378342 A1   12/2020 Hudson et al.
2021/0285400 A1 *  9/2021 Maalioune .............. F02K 1/766

FOREIGN PATENT DOCUMENTS

EP          1043492 A2     10/2000
EP          1043492 A3      9/2001
EP          2865851 A1      4/2015

OTHER PUBLICATIONS

European Search Report for Application No. 21275154.9, mailed Apr. 8, 2022, 9 pages.

* cited by examiner

*Primary Examiner* — Andrew H Nguyen
(74) *Attorney, Agent, or Firm* — CANTOR COLBURN LLP

(57)          ABSTRACT

A method of determining the status of a lock. The method includes reading data from a proximity switch and calculating an inductance value from a solenoid, the proximity switch and solenoid located in or around a lock, and processing the data from the proximity switch and the inductance value. The method further includes comparing the processed data with an expected value to confirm the lock status.

1 Claim, 3 Drawing Sheets

LOCK POSITION SENSING

CROSS-REFERENCE TO RELATED APPLICATIONS

This application claims priority to European Patent Application No. 21275154.9 filed Nov. 3, 2021, the entire contents of which is incorporated herein by reference.

TECHNICAL FIELD

The present disclosure relates to lock position sensing. In particular, the present disclosure relates to thrust reverser lock position sensing.

BACKGROUND

Lock position sensing is ordinarily carried out by providing proximity switches in order to sense the positions of mechanical locks. Typically, there are three mechanical locks per thrust reverser actuation system, with two proximity switches allocated to each lock for sensing the positions of each lock.

SUMMARY OF THE INVENTION

In one aspect, there is provided a method that includes reading data from a proximity switch and calculating an inductance value from a solenoid, the proximity switch and solenoid located in or around a lock, and processing the data from the proximity switch and the inductance value. The method further includes comparing the processed data with an expected value to confirm the lock status.

The lock may comprise a primary lock and a tertiary lock. The method may also further comprise determining if the lock is in an unlocked position, and, if it is determined that the lock is in an unlocked position, the method proceeds to a next stage of flight.

Further, if it is determined that the lock is not in an unlocked position, the method may further comprise determining whether the tertiary lock or the primary lock is unlocked. If it is determined that the tertiary lock is locked, the method may not proceed to the next stage of flight. If it is determined that the primary lock is locked, the method may further comprise reporting a primary lock fault.

The next stage of flight may be deploying a thrust reverser actuation system.

In another aspect, there is provided a method that includes calculating a first inductance value of a primary solenoid and calculating a second inductance value of a secondary solenoid, said primary and secondary solenoids located in or around a lock, and processing the first inductance value and the second inductance value. The method further includes comparing the processed values with an expected value to confirm the lock status.

The lock may comprise a primary lock and a tertiary lock. The method may also further comprise determining if the lock is in an unlocked position, and, if it is determined that the lock is in an unlocked position, the method proceeds to a next stage of flight.

Further, if it is determined that the lock is not in an unlocked position, the method may further comprise determining whether the tertiary lock or the primary lock is unlocked. If it is determined that the tertiary lock is locked, the method may not proceed to the next stage of flight. If it is determined that the primary lock is locked, the method may further comprise reporting a primary lock fault.

The next stage of flight may be deploying a thrust reverser actuation system.

DETAILED DESCRIPTION

Figure 1:
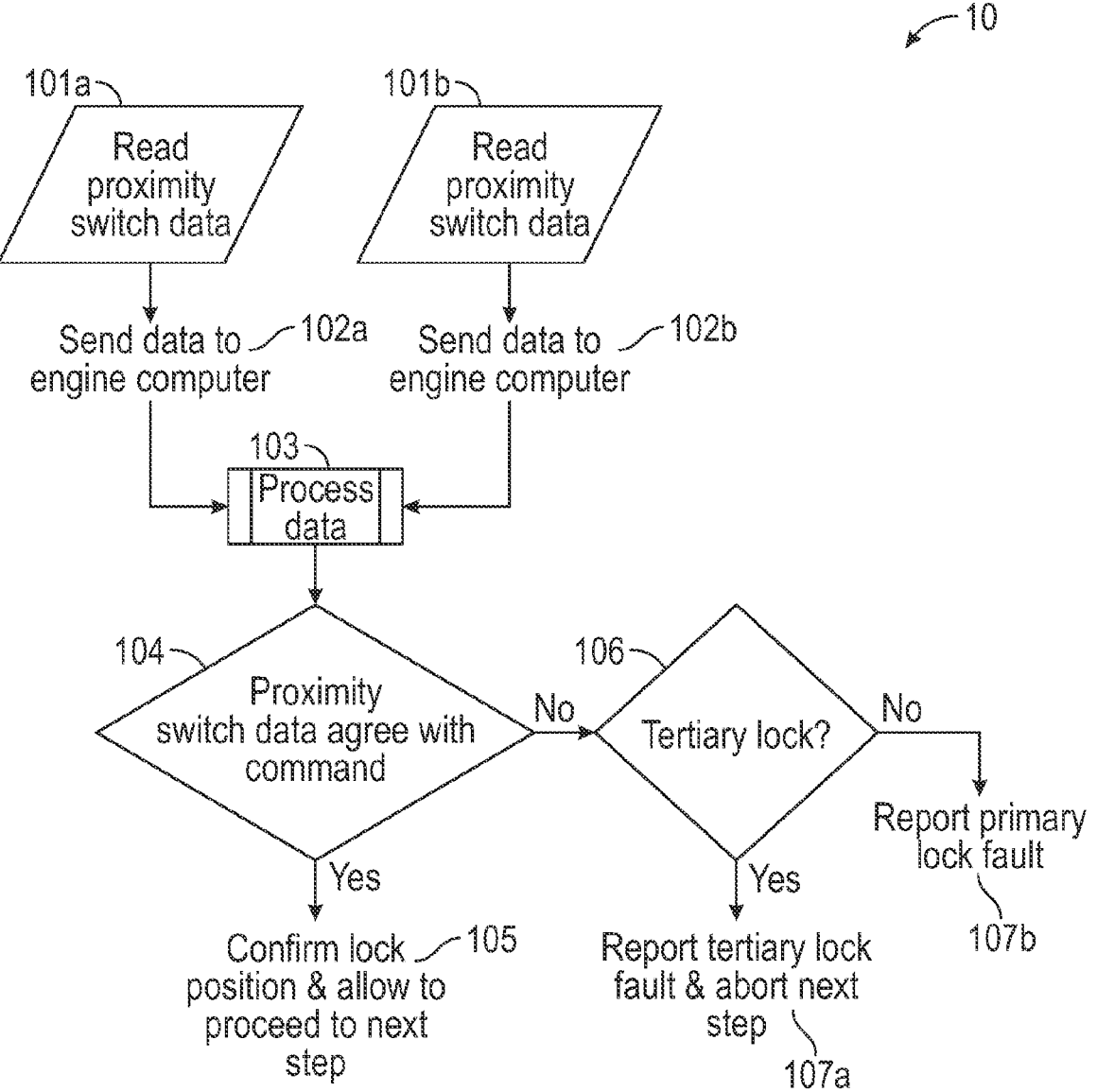
FIG. 1 shows a conventional method of sensing lock positions.

FIG. 1 shows an example of a method for sensing the lock position. The general flow chart 10 is shown in FIG. 1. As an example, the method includes reading proximity switch data from a first proximity switch, as shown at step 101*a*. The method also reads proximity switch data from a second proximity switch, as shown at step 101*b*. The proximity switches are located around the tertiary lock and primary lock to indicate when the lock is in locked or unlocked position. For example, there may be proximity switches located around a lock that includes the tertiary lock and the primary lock, or there may be provided proximity switches around the tertiary lock and then further proximity switches around the primary lock.

At step 102*a*, the data from step 101*a* is sent to the engine computer. At step 102*b*, the data from step 101*b* is also sent to the engine computer. The data is then processed at step 103. At step 104, the processed data is compared with a lock command to ascertain whether the lock is in an expected position. If the proximity switches determine that the tertiary lock is in an unlocked position, step 105 confirms that the tertiary lock is in an unlocked position and the engine computer can move on the next step of flight. If the data from the proximity switches determine that the tertiary lock is not in an unlocked position, step 107*a* reports a fault in the tertiary lock and the engine computer does not move on to the next step.

For example, step 103 processes the data sent to the engine computer from steps 102*a* and 102*b* to compare the sensors data and determine the status of the primary and tertiary locks. If it is determined that the proximity switches data is showing that the locks are in an unlocked position then the engine computer may proceed with the next stage of flight, as shown at step 105. If it is determined that the data comparing the lock status differ then stage 106 determines whether the difference of proximity switch data is linked to the tertiary lock as shown in step 106. If it is the case then a tertiary lock fault is reported and the next step of the thrust reverser actuation system functionality which consists of a deploy is aborted as shown in step 107*a*. If the tertiary lock proximity switch data does not differ and the difference in proximity switch data is associated with the primary lock then a primary lock fault failure is reported at step 107*b*.

Figure 2:
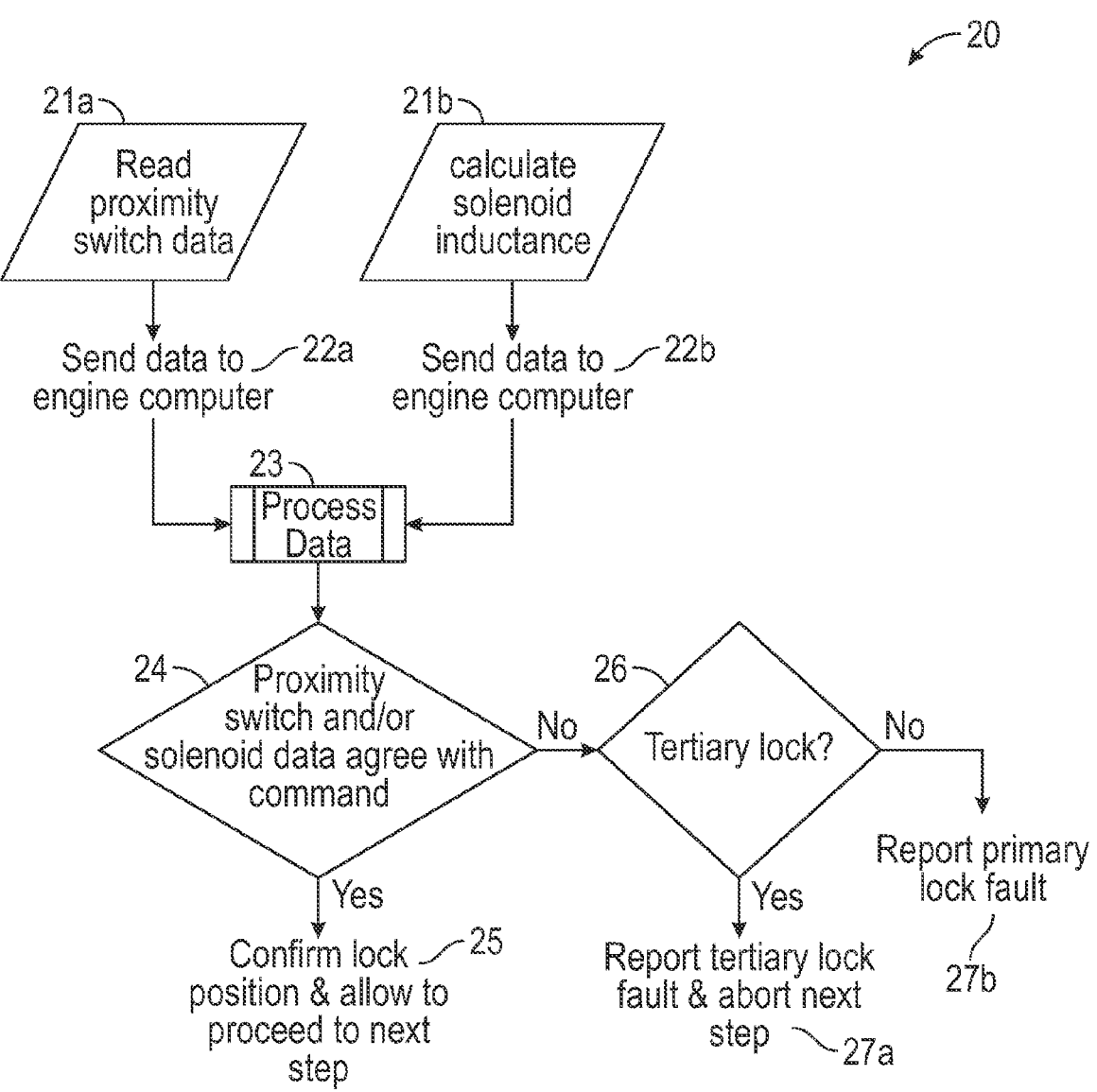
FIG. 2 shows a new proposed method of sensing lock positions.

A method for lock position sensing, according to this disclosure, is shown in FIG. 2. A general flow chart 20 is shown in FIG. 2. As an example, the method includes reading a single proximity switch that is located in the system at step 21*a*. Therefore, in this example method, there is only one proximity switch provided at or around a lock. The lock may include a tertiary lock and a primary lock. The method may also include calculating a solenoid inductance of a solenoid provided in or around the lock at step 21*b*. At step 22*a*, the data read by step 21*a* is sent to the engine computer. At step 22*b*, the solenoid inductance calculated at step 21*b* is sent to the engine computer. Step 23 processes the data sent to the engine computer from steps 22*a* and 22*b* to compare the data with values to determine whether the lock is unlocked at step 24. If it is determined that the proximity switch and/or the solenoid inductance show that the lock is unlocked, it is confirmed that the tertiary lock is unlocked and the engine computer may proceed with the next stage of flight (for example, deployment of the thrust reverser actuation system), as shown at step 25. If it is determined that the lock is in a locked position, the method then determines whether the tertiary lock or the primary lock is unlocked. If it is determined that the tertiary lock is not unlocked then a fault is reported at step 27*a* and the engine computer does not proceed to the next stage of flight (for example, the engine computer does not proceed to deployment of the thrust reverser actuation system). If it is determined that the primary lock is locked, the method at step 27*b* reports that there must be a primary lock fault.

Figure 3:
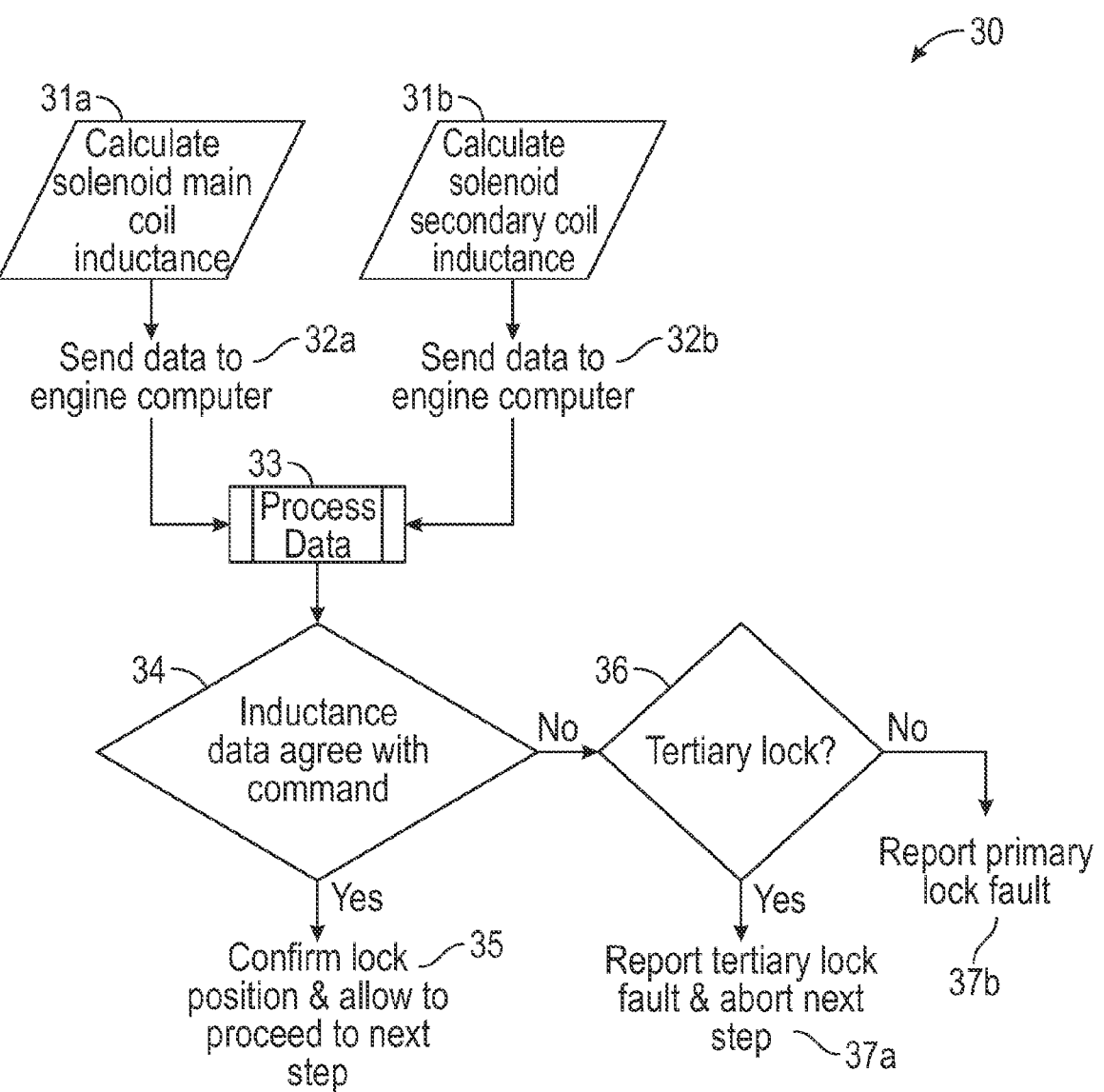
FIG. 3 shows a further new method of sensing lock positions.

An alternative method for lock position sensing, according to this disclosure, is shown in FIG. 3. A general flow chart 30 is shown in FIG. 3. As an example, the method includes calculating an inductance value from a primary solenoid located in the system at step 31*a*. Therefore, in this example method, there are no proximity switches. The method may also include calculating an inductance value of a secondary solenoid provided in or around the lock at step 31*b* or a secondary coil located in the proximity of the primary coil. The lock may include a primary lock and a tertiary lock. At step 32*a*, the primary solenoid inductance value is sent to the engine computer at step 31*a*. At step 32*b*, the secondary solenoid inductance value calculated at step 31*b* is sent to the engine computer. Step 33 processes the inductance values sent to the engine computer from steps 32*a* and 32*b* to compare the values to determine the lock position at step 34. If it is determined that the primary solenoid inductance value and/or the secondary solenoid inductance value show that the lock is unlocked, it is confirmed that the tertiary lock is unlocked and the engine computer may proceed with the next stage of flight (for example, deployment of the thrust reverser actuation system), as shown in step 35. If it is determined that the lock is not in an unlocked position, the method then determines whether the tertiary lock or the primary lock is unlocked. If it is determined that the tertiary lock is locked, then a fault is reported at step 37*a* and the engine computer does not proceed to the next stage of flight (for example, the engine computer does not proceed to deployment of the thrust reverser actuation system). If it is determined that the primary lock is locked, the method at step 37*b* reports that there must be a primary lock fault.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A method of confirming a lock status of a lock by an engine computer for a thrust reverser prior to deploying the thrust reverser by a thrust reverser actuation system, the method comprising:

reading, by the engine computer, data from a proximity switch for a lock, which includes a primary lock and a tertiary lock, of the thrust reverser and calculating an inductance value from a solenoid for the lock, wherein the proximity switch and the solenoid are located in or around the lock;

processing, by the engine computer, the data from the proximity switch and the inductance value from the solenoid; and wherein the engine computer is configured for:

reading the data from the proximity switch sent to the engine computer;

calculating solenoid inductance sent to the engine computer;

processing the data sent to the engine computer to compare the data with values to determine whether the lock is unlocked, and thereafter:

upon determining that the proximity switch and/or the solenoid inductance show that the lock is unlocked, it is confirmed that the tertiary lock is unlocked and the engine computer proceeds with deployment of the thrust reverser actuation system; and upon determining that the lock is in a locked position, then determining whether the tertiary lock or the primary lock is unlocked, and upon determining that the tertiary lock is not unlocked, reporting a fault and not proceeding to deployment of the thrust reverser actuation system.

\* \* \* \* \*